Figure 1:
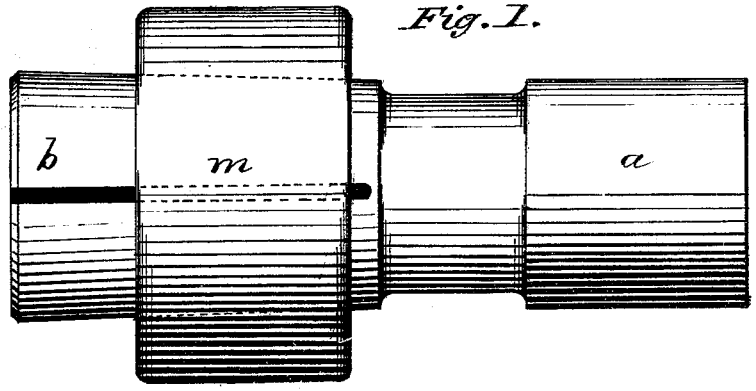
Figure 2:
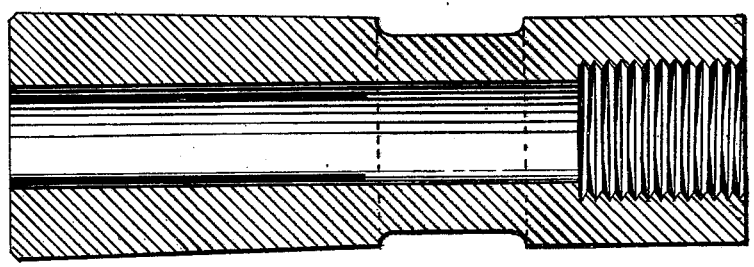
Figure 3:
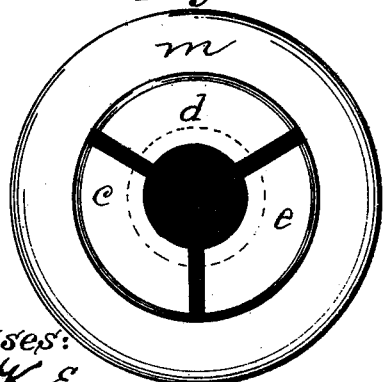

G. G. ROE & W. F. TALLMAN.
ROCK DRILL CHUCK.

No. 180,730. Patented Aug. 8, 1876.

Witnesses:
Rich. K. Evans
A. H. Evans

Inventors:
George G. Roe,
William F. Tallman
by Folger & Mandeville,
their Attorneys.

UNITED STATES PATENT OFFICE.

GEORGE G. ROE AND WILLIAM F. TALLMAN, OF MINEVILLE, ASSIGNORS OF PART OF THEIR RIGHT TO GEORGE H. REYNOLDS, OF NEW YORK, WALTER TEFFT, OF MINEVILLE, AND AARON NALL AND OLIVER S. PRESBREY, OF CHEEVER, N. Y.

IMPROVEMENT IN ROCK-DRILL CHUCKS.

Specification forming part of Letters Patent No. 180,730, dated August 8, 1876; application filed April 26, 1875.

*To all whom it may concern:*

Be it known that we, GEORGE G. ROE and WILLIAM F. TALLMAN, both of Mineville, in the county of Essex, in the State of New York, have invented a new and useful Improvement in Chucks for Mining-Drills, of which the following specification and its accompanying drawing are a full, clear, and exact description.

We have devised a chuck which is specially adapted for use upon a mining-drill, to the piston-rod of which it may be welded, screwed, or keyed. Its outer end is bored to receive the drill, which abuts against the piston-rod, and its inner end is also bored, so that by means of a screw-thread the chuck may be securely fastened upon the end of the piston-rod. The chuck is bored clear through its entire length, divided longitudinally into three parts for about two-thirds of its length, and the divided part is tapered, so that its greatest diameter is at its outer end. We fit a stout plain metal band upon the tapered part, the band being reversely tapered, so that it neatly fits the chuck. The divided chuck is very strong and stiff, but the parts are sufficiently elastic to hold and release the drill by tightening or loosening the band.

In the drawing, Figure I is a side view; Fig. II, a longitudinal section, the chuck having an outside groove to give elasticity to the jaws; Fig. III, an end view of a three-slotted chuck; and Fig. IV, an end view of a two-slotted chuck, the dotted lines showing a shank-hole worn oval.

The piston-rod of the drill is reciprocated violently by the force of steam or compressed air. The outer end of the piston-rod is threaded to screw into the solid inner end *a* of the chuck. The drill-shank is a little less in diameter than the piston-rod, and when inserted at the outer end *b* it fits closely the central bore of the chuck. The shank abuts against the end of the piston-rod, so that the shock of the blows will not tear out the screw-threads in the chuck, and thus loosen the chuck on the piston-rod. Heretofore chucks have been made with a solid partition between the drill-shank and the piston-rod; but this construction was defective in that the keys used to fasten the chuck on the piston-rod were being constantly shaken loose. Moreover, if the chuck were screwed on instead of keyed, (a partition being between the shank and rod,) the force of the blows would come on the screw-thread, and an hour's work would ruin the chuck. The chuck is, furthermore, divided longitudinally, preferably into three parts or jaws, *c d e*, for more than one-half its length. The jaws are separated by narrow slots, which, in a chuck of two and a quarter inches in diameter, are about three-sixteenths of an inch in width. The cylindrical chuck is slightly tapered, and its outer end is bound within a stout, plain metal band, *m*, the inner face of which is tapered to neatly fit the chuck. Before inserting a drill the band is moved inward on the chuck to let the jaws spring out for its admission. After the drill is inserted the band is moved outward on the slightly tapered and divided part of the chuck by one or more blows of a hammer, thus closing the jaws with an equal pressure upon all sides, and firmly clasping the drill. The band is further moved outward by its momentum when the drill strikes the rock. At the first blow of the drill the shank is fast. A drill may be quickly removed by loosening the band with a hammer.

The chuck is preferably made of steel. Its outer end may be formed in three or more divisions; but three are found preferable. Instead of splitting our chuck through its entire length, we make the end that receives the piston-rod solid, so that only one band is necessary.

There is a very material difference of construction between a two-slotted and a three-slotted chuck. In the former, although the band can be driven outward just the same when the shank hole or the drill-shank is worn, the jaws of the chuck cannot pinch the shank tightly enough to hold it. Tightening the band will not effect a closer gripe, because the jaws will have met, and they can do no more. The interior surface of the chuck being worn, its jaws are no longer in thorough holding contact with the drill-shank.

Figure 4:
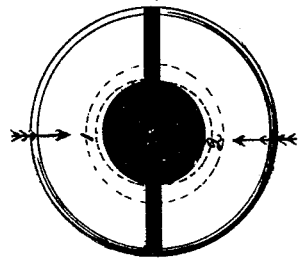

The drills, from lying about in the mines, become partially covered with adhering ore-dust. As they are hastily changed every five or ten minutes this adhering material, under the action of an estimated five-hundred-pound blow, repeated at the rate of two hundred a minute, soon begins to wear away by friction the drill-shank and chuck-jaws. When the band is driven outward toward that end of the chuck into which the drill is inserted, the two jaws close. The pressure comes in direction of the two arrows, and not from the sides of the band marked 3 and 4, Fig. 4; but little pressure exists there. Consequently all the wear is at the surfaces marked 1 and 2. The shank-hole will wear oval and not round. As a result, when beginning to drill a new hole, the drill will not strike a point on a center with its axis. It will strike all around such central point because of the rotation of the drill. The play of the drill is constantly attended with great friction, because it is always playing off of a true center, rubbing against the rock or ore body, instead of playing directly in a line of its axis.

The objection to a two-slotted chuck is, that when the shank-hole has worn oval the piston will throw the drill out of the chuck, and the chuck must be thrown away as worn out; but in a chuck of our construction the shank-hole always wears round, thus permitting its continued use after a considerable portion of the inner face of the jaws is worn away.

Having now described our invention, what we claim as new, and desire to secure by Letters Patent, is—

1. In a chuck for mining-drills, the combination, with the springing jaws, of a plain compressing-band, for the purposes set forth.

2. A chuck for mining drills, constructed as described, having a cylindrical bore extending clear through it, so that the end of the drill-shank abuts against the end of the piston-rod.

3. A drill-chuck having its outer end tapered and slotted, and its inner end solid and threaded, and provided with a plain binding-ring, substantially as described.

In testimony whereof we have hereunto set our hands this 22d day of April, 1875, in the presence of two subscribing witnesses.

GEORGE G. ROE.
WILLIAM F. TALLMAN.

Witnesses:
JOHN W. WHITEHEAD,
WILLIAM H. BIGALOW.